(12) United States Patent
Verma

(10) Patent No.: US 11,475,636 B2
(45) Date of Patent: Oct. 18, 2022

(54) AUGMENTED REALITY AND VIRTUAL REALITY ENGINE FOR VIRTUAL DESKTOP INFRASTUCTURE

(71) Applicant: VMWARE, INC., Palo Alto, CA (US)

(72) Inventor: Shubham Verma, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 15/888,112

(22) Filed: Feb. 5, 2018

(65) Prior Publication Data
US 2019/0130645 A1 May 2, 2019

(30) Foreign Application Priority Data
Oct. 31, 2017 (IN) .............................. 201741038694

(51) Int. Cl.
| | | |
|---|---|---|
| *G06T 19/00* | (2011.01) | |
| *G06F 3/01* | (2006.01) | |
| *G06F 3/04815* | (2022.01) | |
| *G06F 9/451* | (2018.01) | |

(52) U.S. Cl.
CPC .............. *G06T 19/006* (2013.01); *G06F 3/011* (2013.01); *G06F 3/04815* (2013.01); *G06F 9/451* (2018.02)

(58) Field of Classification Search
None
See application file for complete search history.

(56) References Cited

U.S. PATENT DOCUMENTS

| | | | |
|---|---|---|---|
| 6,898,307 B1* | 5/2005 | Harrington | G06F 3/017 345/633 |
| 8,141,090 B1* | 3/2012 | Graupner | G06F 9/45558 709/225 |
| 8,200,796 B1 | 6/2012 | Margulis | |
| 2001/0012393 A1* | 8/2001 | Yonezawa | G01N 21/8803 382/145 |
| 2002/0126751 A1* | 9/2002 | Scheurich | H04N 5/232 375/240.02 |
| 2011/0299776 A1* | 12/2011 | Lee | G06K 9/00234 382/173 |
| 2015/0042553 A1 | 2/2015 | Mecham | |
| 2015/0235432 A1 | 8/2015 | Bronder et al. | |
| 2016/0292832 A1* | 10/2016 | Bogan | G06T 3/0075 |

(Continued)

*Primary Examiner* — Frank S Chen
(74) *Attorney, Agent, or Firm* — Patterson & Sheridan, LLP

(57) ABSTRACT

Embodiments of the present disclosure relate to techniques for providing an augmented reality experience for virtual desktops. In particular, certain embodiments relate to acquiring, by a computing device one or more images from a client device and determining, by the computing device, that the one or more images contain an artifact to be augmented. Further, certain embodiments involve acquiring, by the computing device, a screen buffer from a virtual desktop or application running on it and applying, by the computing device, a geometric transformation to the screen buffer. Further, certain embodiments relate to augmenting, by the computing device, the one or more images by inserting the screen buffer onto the artifact, resulting in one or more augmented images. Further, certain embodiments relate to providing, by the computing device, the one or more augmented images to the client device in order to provide a user of the client device with the augmented reality experience.

27 Claims, 4 Drawing Sheets

(56) References Cited

U.S. PATENT DOCUMENTS

| | | |
|---|---|---|
| 2016/0292924 A1* | 10/2016 | Balachandreswaran ............... A63F 13/32 |
| 2017/0085656 A1 | 3/2017 | Abbott et al. |
| 2017/0270582 A1* | 9/2017 | Forss ................. G06Q 30/0623 |
| 2017/0272545 A1* | 9/2017 | Kwon ..................... H04L 67/38 |
| 2017/0287221 A1* | 10/2017 | Ghaly ................ G02B 27/0172 |
| 2017/0352192 A1 | 12/2017 | Petrovskaya et al. |
| 2018/0095542 A1* | 4/2018 | Mallinson ............... G06F 1/163 |
| 2018/0308199 A1 | 10/2018 | Vembu et al. |
| 2018/0343179 A1* | 11/2018 | VanBlon ................. H04L 43/08 |
| 2019/0130645 A1 | 5/2019 | Verma |
| 2019/0147658 A1* | 5/2019 | Kurabayashi ............. G06T 7/90 345/423 |
| 2019/0213767 A1 | 7/2019 | Verma |

\* cited by examiner

AUGMENTED REALITY AND VIRTUAL REALITY ENGINE FOR VIRTUAL DESKTOP INFRASTUCTURE

RELATED APPLICATION

Benefit is claimed under 35 U.S.C. 119(a)-(d) to Foreign Application Serial No. 201741038694 filed in India entitled "AUGMENTED REALITY AND VIRTUAL REALITY ENGINE FOR VIRTUAL DESKTOP INFRASTRUCTURE", on Oct. 31, 2017, by VMware, Inc., which is herein incorporated in its entirety by reference for all purposes

BACKGROUND

Users typically interact with applications running on computing devices (e.g., desktop and laptop computers, mobile phones, tablets, and the like) using input devices such as keyboards, mice, and touch-screens, and output is usually provided to users through display devices such as monitors. Due to the inherent limitations in these forms of input and output, emerging technologies such as virtual reality (VR) and augmented reality (AR) involve the expansion of input and output methods.

Virtual reality (VR) technologies generally involve the computer-implemented simulation of up to a 360-degree experience which a user views using, for example, a wearable display (e.g., VR goggles). Augmented reality (AR) technologies generally involve the real-time addition of simulated content into a real-life scene being captured by a user device (e.g., a camera), which the user views through a display device, such that the simulated content appears through the display device to be present in the real-life scene. In both VR and AR technologies, users may provide input through traditional input methods (e.g., keyboards, mice, touchscreens, audio, and the like) as well as through movements and gestures (e.g., captured by motion sensors, cameras, and the like).

While the potential uses for VR and AR technologies are many and varied, there is currently only a limited number of computing applications which support these technologies. Due to the resource limitations of individual VR and AR devices (e.g., VR/AR wearable displays or mobile phones used to view VR and AR experiences may have limited computing resources), many types of applications may be too resource-intensive to efficiently support VR and AR functionality for such devices. Without access to VR and AR functionality, users of many computing applications may choose to purchase larger computer monitors and/or multiple computer monitors in order to expand the display area. Because of the limitations and costs associated with computer monitors and other traditional input and output devices, there exists a need for alternative methods of expanding the input and output capabilities of computing applications which, for various reasons, do not offer native support for VR and AR technologies.

DETAILED DESCRIPTION

Figure 1:
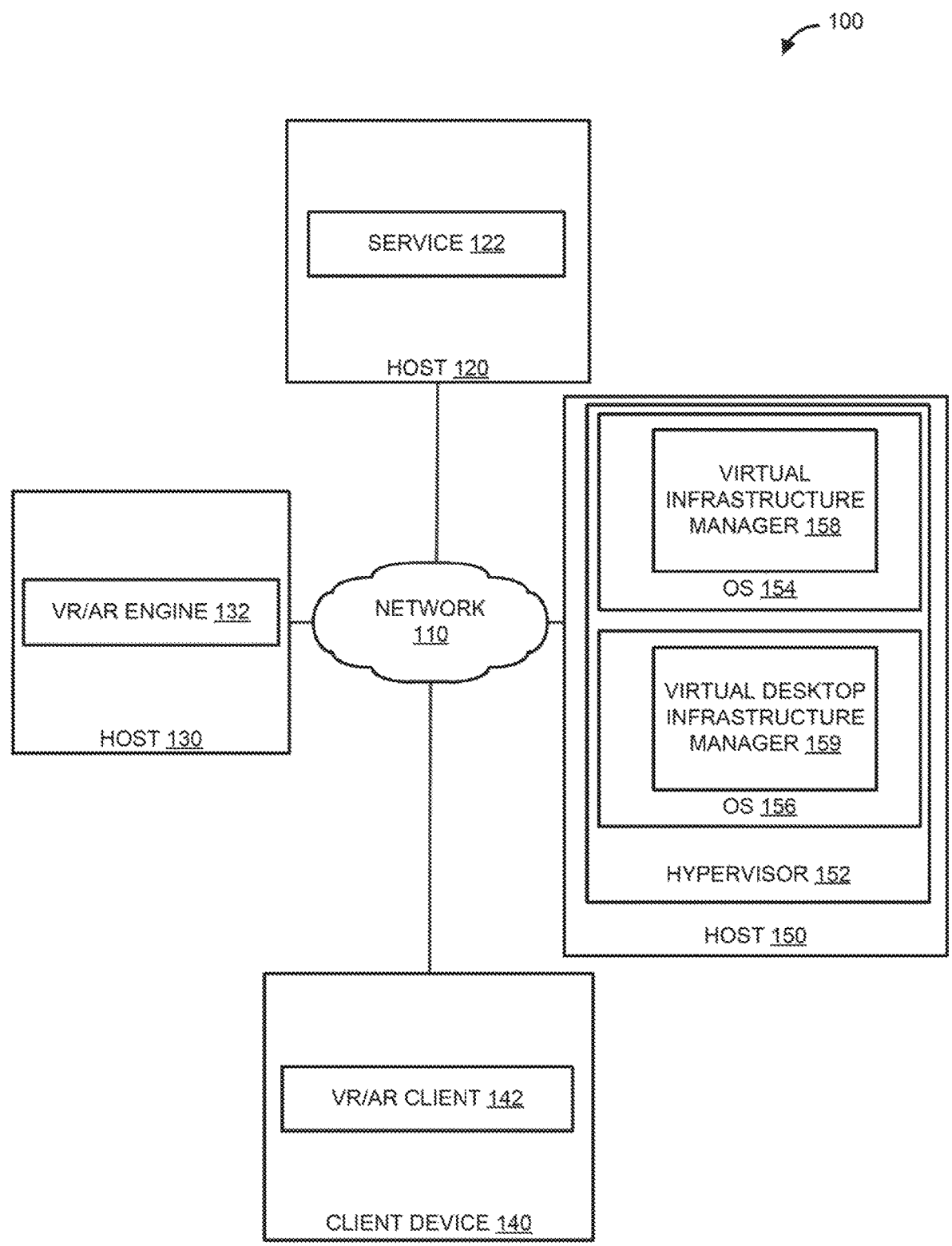
FIG. 1 illustrates components of an example computing environment in which an embodiment may be implemented.

Embodiments presented herein relate to techniques for providing a virtual reality (VR) and/or augmented reality (AR) engine. In certain embodiments, processing associated with the VR/AR engine may be performed on one or more computing devices (e.g., a server) remote from the client device through which the user views the VR/AR content (e.g., VR or AR goggles/glasses, mobile phones, and the like), and separate from an application with which the user interacts through VR/AR using the client device. This independent, remote processing allows for the VR/AR engine to run more efficiently, not being limited to the resources of the client device, and to be compatible with applications which do not offer native VR/AR support. For example, a user may wish to use VR/AR functionality to access a particular application which involves heavy resource usage and does not offer native VR/AR support (e.g., a virtualization application which provides virtual machines). According to embodiments of the present disclosure, a VR/AR engine may acquire real-time image data from the client device, captured using a sensor such as a camera of the client device. The VR/AR engine may also acquire input from various other sensors (e.g., accelerometer, gyrometer, magnometer, global position system (GPS), and the like). If the client device comprises a wearable AR display, for example, real-time images of the user's surroundings may be captured by a camera associated with the wearable AR display and provided to the VR/AR engine so that augmentation may be performed.

The VR/AR engine may perform pre-processing on the images (e.g., resizing, removing noise, and the like), and then proceed to detecting and extracting features from the images. For example, the VR/AR engine may identify a particular artifact such as a piece of paper with some pattern printed on it (in case of marker-based detection) or some relevant context-specific object like a computer numeric control (CNC) machine or car's engine (in case of markerless detection), in the scene so that the artifact can be "augmented" with content such as the execution screen of a virtual desktop. In some embodiments, artifacts may be detected in a scene using homography, which is a method of finding the geometrical transform between two planar images. If the scene image is too shaky to detect features, the image may be stabilized first. Once an artifact to be augmented has been detected and extracted (e.g., a bounding box has been drawn around the artifact), the VR/AR engine may acquire virtual desktop content (e.g., a screen buffer from the virtual desktop or a particular application/application-area from the virtual desktop) so that the virtual desktop or its content can be added onto the artifact.

In some embodiments, the VR/AR engine performs a warp operation in order to modify the perspective of the application content so that it will match that of the artifact on which it is to be added. The VR/AR engine may then generate a mask for the application content in order to augment the scene image with the application content. The application content with the mask may be copied onto the scene image, and the final image may be rendered and output to the client device for display. This process may be performed on an ongoing basis so that the application content continues to track with the artifact as it moves in the scene image in real-time.

FIG. 1 illustrates components of a computing environment 100 in which embodiments of the present disclosure may be implemented. As shown, system 100 includes host 120, host 130, and client device 140. Hosts 120, 130, and 150 may comprise physical or virtual computing devices (e.g., servers) which are connected to network 110. While three hosts, 120, 130, and 150 are depicted, there may be any number of hosts in computing environment 100. Client device 140 may comprise a computing device such as a desktop or laptop computer, mobile phone, tablet computer, or a virtual realty or augmented reality device (e.g., VR goggles, wearable AR display, etc.).

Host 120 runs a service 122, which may comprise a web service or a native library with both kernel-mode and user-mode components accessed by client device 140 via VR/AR client 142. User-mode components, on request to retrieve a screen buffer, may either request the dedicated kernel-mode component or invoke pre-built components/drivers of the operating system. For example, VR/AR client 142 may comprise an interface (e.g., a browser or other local software interface, such as a VR/AR software application) through which a user of client device 140 accesses service 122. In one embodiment, service 122 comprises a virtualization program through which the user provisions, manages, and accesses virtual machines. While service 122 is depicted as being located on a single host 120, service 120 may also comprise a distributed service which is distributed across a plurality of computing devices.

Host 130 comprises a VR/AR engine 132, which may perform functions related to providing a user of client device 140 with a VR or AR experience of service 122. By implementing VR/AR functionality with VR/AR engine 132 on server 130, there may not be a need for service 122 to natively support VR/AR technology, or for the computing resources of client device 140 to be burdened with all of the processing associated with such functionality. While VR/AR engine 132 is depicted as being located on a single host 130, VR/AR engine 132 may also be distributed across a plurality of computing devices, or may be located on the same computing device as service 122.

In an embodiment, a user may utilize VR/AR client 142 on client device 140 to access service 122 as a VR/AR experience, and VR/AR engine 132 may act as an intermediary to provide this functionality. For example, client device 140 may use an associated camera to capture real-time images of the real-world environment around client device 140 (e.g., images may be captured at a frame rate and resolution specified by VR/AR engine 132, such as 15 Hz and 640×480) and provide these images to VR/AR engine 132 (e.g., via network 110). VR/AR engine 132 may acquire the images from client device 140 and then perform pre-processing in order to prepare the images for feature detection. Pre-processing of an image may involve, for example, resizing the image (e.g., using bilinear interpolation) and filtering the image (e.g., smoothing, noise removal, and the like). Filtering the image may be accomplished, for example, by a convolution process involving the use of a Gaussian filter. Throughout pre-processing, image data is preferably passed among various functions (e.g., software methods) of VR/AR engine 132 by reference (as opposed to performing a deep copy of the image data) in order to conserve resources. Once VR/AR engine 132 has completed pre-processing, feature detection begins.

A feature refers to a unique characteristic of an image that helps to uniquely identify it. For example, an artifact (e.g., an object, such as a piece of paper) in the scene may be a feature. VR/AR engine 132 may use a feature detection method such as the open-source A-KAZE feature detection program. In some embodiments, VR/AR engine 132 uses homography, which involves finding the geometric transform between two planar images, in the feature detection process. VR/AR engine 132 may calculate homography using random sampling consensus (RANSAC), which comprises an iterative method to estimate parameters of a mathematical model from a set of observed data that contains outliers, the outliers being accorded no influence on the values of the estimates.

VR/AR engine 132 may use feature detection to search for a particular artifact in the scene. In some embodiments, the user specifies the artifact which is to be augmented by interacting with VR/AR client 142 on client device 140. For example, the user may indicate through input (e.g., received as gestures via a camera, though mouse/keyboard input, and the like) the artifact which is to be augmented, and VR/AR client 142 may provide this indication to VR/AR engine 132. In certain embodiments, the user may further specify conditions under which augmentation is to be performed (e.g., the user may indicate through VR/AR client 142 that augmentation is to be performed when the user is at a certain geographic location, determined using a global positioning system associated with client device 140). In these embodiments, VR/AR engine performs feature detection only if the condition(s) specified by the user are satisfied (e.g., if client device 140 indicates that it is in a particular geographic location). In alternative embodiments, VR/AR engine may determine an artifact to be augmented without user input (e.g., based on predetermined rules, such as ideal artifact dimensions for a particular augmentation task).

When VR/AR engine 132 has identified an artifact in the scene to be augmented (e.g., through feature detection), VR/AR engine 132 then draws a bounding box around the detected artifact in the scene image and obtains the coordinates of the bounding box by applying a perspective transform on the artifact using the homography matrix which represents the geometric transform between the scene image and the artifact. The bounding box may be used by VR/AR engine 132 to extract or isolate the artifact from the rest of the scene. The position of the artifact is then tracked for each subsequent image in the scene (e.g., each subsequent frame acquired from the camera of client device 140).

Other methods of detecting and extracting artifacts may be employed as well without departing from the scope of the present disclosure, such as alternative machine learning algorithms.

When VR/AR engine 132 has detected/extracted the artifact in the scene, and has determined that any necessary conditions are satisfied (e.g., client device 140 is in a particular geographic location specified by the user), VR/AR engine 132 continues with the augmentation process. For example VR/AR engine 132 may acquire an application screen buffer from service 122. In the case that service 122 comprises a virtualization application, the application screen buffer may comprise a virtualization "dashboard" or the desktop screen of a virtual machine implemented by service 122. The application screen buffer may, for example, comprise the desktop screen of a virtual machine which was previously being transported from service 122 to VR/AR client 142, and is now acquired by VR/AR agent 132 in order to add it to the scene images captured from client device 140 to create an augmented reality experience.

Numerous protocols exist for transporting screen buffers between network locations, such as Blast, PCoIP, Remote Desktop Protocol (RDP), and the like, and any of these protocols may be used to transport the application screen buffer from service 122 to VR/AR engine 132 to be rendered onto images of the user's environment. In some embodiments, VR/AR engine 132 performs pre-processing on the images from the virtual desktop screen buffer as needed in order to remove noise and the like. The virtual desktop screen buffer is then used by VR/AR engine 132 as a target image for augmenting the artifact detected in the scene image.

VR/AR engine 132 may perform warping on the target image by applying a geometric transform (e.g., perspective transform) to the target image. In some embodiments, the geometric transform is based on the nearest neighbor interpolation technique, which approximates the value of a function for a non-given point in a particular space when given the value of that function in points around (neighboring) that point. Once the target image has been warped appropriately to be added to the artifact in the scene, VR/AR engine 132 generates a binary mask for the target image so that the target image may be appropriately placed on the scene image.

VR/AR engine 132 may then produce the final scene image by copying the pixel buffer of the warped target image, using the binary mask generated above, to the scene image acquired from client device 140. This results in a final scene image wherein the application screen buffer appears on the artifact in the user's environment. VR/AR engine 132 continuously tracks the coordinate frame of the artifact as subsequent scene images are acquired (e.g., from the camera on client device 140) and augments it with the target image (e.g., the warped application screen buffer). The final scene images may be rendered by VR/AR engine 132 and provided to client device 140 so that the user may view the augmented reality experience. For example, if client device 140 comprises a wearable VR display, the user's environment will appear through the wearable display to be augmented with the application screen buffer (e.g., the screen of a virtual desktop) being overlaid on the artifact (e.g., a piece of paper in the user's hands), moving with the artifact as it is moved by the user. The VR/AR engine 132 may interact with the virtual infrastructure manager 158 (like vCenter), connected over network 110, to perform a variety of actions on a virtual machine on host 120 through client device 140 (e.g., using input such as gestures), such as suspending, starting, stopping, taking a snapshot, taking a screenshot, triggering migration, creating templates, and sharing the virtual machine.

In alternative embodiments, some processing attributed to VR/AR engine 132 above may be instead performed by client device 140 (e.g., by VR/AR client 142). For example, warping and/or rendering tasks may be performed by client device 140. In some embodiments, the pixel buffer of the target image (e.g., virtual desktop screen buffer) does not need to be copied to the scene image by VR/AR engine 132. In these embodiments, the coordinate frame of the bounding box of the artifact is used in order to project the warped target image onto the origin (e.g., (0,0)) of the coordinate frame by the client device 140 (e.g., augmented reality glasses or mobile phone).

Furthermore, augmentation may be performed with only certain aspects of an application screen being used as target images (e.g., a single application window running within a virtual machine or a single element or object within an application may be projected onto one or more artifacts in the user's environment). In other embodiments, a target image may be projected onto a plurality of artifacts or onto a fixed location which is not tied to any artifacts in the user's environment.

In certain embodiments, VR/AR engine 132 may also augment scene images with advertisements. For example, VR/AR engine 132 may acquire one or more advertisements (e.g., from service 122, an advertisement server or data store, etc.), which may comprise multimedia such as video and images, warp the one or more advertisements (e.g., in a manner similar to that described above with respect to other target images such as application screen buffers), and add the one or more advertisements to the scene images so that the user will see the one or more advertisements in the final scene images through client device 140. In some embodiments, advertisements may be added on or near an artifact to be augmented with an application screen buffer. The user may then be able to interact with the one or more advertisements using client device 140, such as through gestures, touch screen, mouse or keyboard. Placing advertisements in a VR or AR space allows for a significant expansion of the display area available for such advertisements.

Host 150 comprises a hypervisor 152, which supports two operating systems 154 and 156. Operating system 154 comprises a virtual infrastructure manager 158, which may perform operations related to a variety of actions on a virtual machine on host 120 through client device 140 (e.g., using input such as gestures), such as suspending, starting, stopping, taking a snapshot, taking a screenshot, triggering migration, creating templates, and sharing the virtual machine. Operating system 156 comprises a virtual desktop infrastructure manager 159, which may perform operations related to collecting configuration information of virtual desktops on host 120, like user entitlements and desktop protocol preferences (BLAST, PCoIP, etc.). These configurations are used by the VR/AR engine to control the access of AR content (screen of virtual desktop or application running on it) to different users.

In some embodiments, if graphics processing unit (GPU) virtualization support (e.g., NVidia GRID) is available on host 120 or host 130, the solution may use them to execute the accelerated high performance parallel versions of the computer vision and related machine learning routines to provide a better augmented reality experience. This will also make the solution less expensive, as multiple users can share the GPU (which is now virtualized and shared on the datacenter) for their VR/AR content (virtual desktop or application running on it), thereby reducing the overall expenditure of the enterprise.

Figure 2:
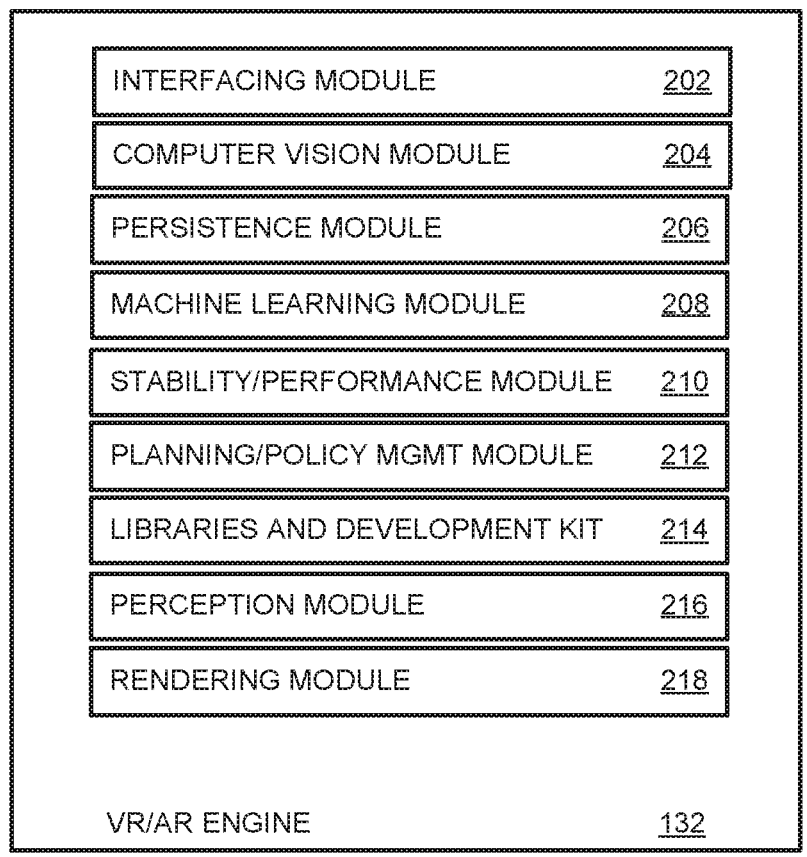
FIG. 2 illustrates components of a virtual reality (VR) and/or augmented reality (AR) engine.

FIG. 2 illustrates components of a virtual reality (VR) and/or augmented reality (AR) engine 132. The components depicted in FIG. 2 are merely exemplary, and the functionality described as being performed by certain components may be performed by any number of local or remote components.

As shown, VR/AR engine 132 comprises interfacing module 202, computer vision module 204, persistence module 206, machine learning module 208, stability/performance module 210, planning/policy management module 212, libraries and development kit 214, perception module 216, and rendering module 218. Interfacing module 202 may perform functionality related to the exchange of information between VR/AR engine 132 and external devices and components. Interfacing module 202 may work in conjunction with a physical interface component such as a network interface card. For example, interfacing module 202 may request and receive scene images from client device 140

(e.g., captured by a camera or other sensor of client device 140). Interfacing module 202 may also request and receive target images to be used for augmenting scene images, such as an application screen buffer from service 122. Interfacing module 202 further outputs final scene images (e.g., scene images augmented with warped target images such as an application screen buffer) to be viewed by users (e.g., interfacing module 202 may send final scene images to VR/AR client 142). In some embodiments, interfacing module 202 encodes images before transmitting them to other components.

Computer vision module 204 performs operations related to various image-processing and object detection, recognition algorithms, for e.g. preparing the target image (e.g., the application screen buffer) for use in augmentation. For example, computer vision module 204 may warp the target image using an appropriate geometric transform so that the target image may be added to a particular artifact in the scene image. Computer vision module 204 may further generate a mask for a target image so that the target image will be aligned with the artifact in the scene image. Persistence module 206 generally maintains settings for the VR/AR engine 132, such as preferred resolution, information identifying artifacts to be augmented, and other user preferences (e.g., conditions such as geographic locations of client device 140 at which to initiate augmentation). Persistence module 206 also provides session persistence (e.g., ability to record the user sessions for a plurality of use-cases including debugging, viewing and sharing the sessions). Various methods are provided, such as—(a) record the screen of a virtual desktop or remote application running on it, directly on the host 120, (b) record the final screen (including the augmented graphics) on either 130 or 140, and (c) perform both a and b operations simultaneously. The method preferred by a user may depend on the storage-space availability on 120, 130 and 140. Machine learning module 208 performs tasks related to detecting objects in images (e.g., identifying artifacts), and involves the use of machine learning algorithms. Machine learning algorithms generally involve building a model based on historical data and making predictions/determinations based on patterns identified in the model in order to overcome the limitations of static program execution (e.g., by making dynamic determinations). As discussed above, VR/AR engine 132 may use feature-engineering for artifact detection, recognition and tracking, but certain determinations involved in the process may be made based on machine learning algorithms (e.g., artifacts may be identified based on predictive determinations made by a model containing historical feature detection data), although the details of the machine learning algorithms are beyond the scope of the present disclosure.

Stability/performance module 210 stabilizes and pre-processes scene images which are too shaky, blurry, distorted, and (or) noisy for features to be accurately detected. For example, if machine learning module 208 or perception module 216 determine that pre-processing is needed on a scene image before feature detection is performed, the scene image may be provided to stability/performance module 210 for pre-processing. Planning/policy management module 212 manages policies related to embodiments of the present disclosure, such as the frame rate and resolution at which images are to be retrieved by interfacing module 202 from client device 140 and the parameters to be used for filters applied by stability/performance module 210 during pre-processing of scene images (e.g., the parameters of smoothing and noise removal filters). Planning/policy Management Module 212 may decide, depending on the policy, whether to perform all the intensive computations (related to computer vision and machine learning) on client device 140 alone (in case client device 140 has sufficient computing, memory and storage resources), or host 130 alone (in case both client device 140 and host 120 are too low on resources or are too busy), or host 120 alone (in case the host 120 has sufficient resources allocated by hypervisor and we need to bypass the host 130 to reduce network latencies). Libraries and development kit 214 comprises software development tools which allow for external applications to interface with VR/AR engine 132 (e.g., through one or more application programming interfaces, or APIs). Planning/policy Management Module 212 interacts with virtual desktop infrastructure manager 158 (like VMware View Connection Server), connected over network 110, to collect configuration information of virtual desktops on host 120, like user entitlements and desktop protocol preferences (BLAST, PCoIP, etc.). These configurations are used by the VR/AR engine to control the access of AR content (screen of virtual desktop or application running on it) to different users. Perception module 216 handles computer vision related routines like feature recognition, detection, and extraction from images. In some embodiments, perception module 216 works in conjunction with machine learning module 208 (e.g., perception module 216 may manage feature detection, and may use machine learning module 208 to perform some tasks which involve machine learning algorithms).

Rendering module 218 renders final scene images, including such tasks as augmenting an artifact in the scene with an application screen buffer. For example, rendering module 218 may receive a target image (e.g., a warped application screen buffer received from computer vision module 204) and augment an artifact in a scene image (e.g., a piece of paper, detected in the scene image by perception module 216 in conjunction with machine learning module 208, which persistence module 206 indicates was identified by the user as an artifact to be augmented) with the target image. In some embodiments, rendering module 218 provides the final scene image to VR/AR client 142 to be viewed by the user.

The components of VR/AR engine 132 collectively perform real-time augmentation of scene images as they are captured from client device 140 and output the final scene images to be viewed by a user on client device 140. In alternative embodiments, rendering tasks are performed by client device 140 rather than AR/VR engine 132.

Figure 3:
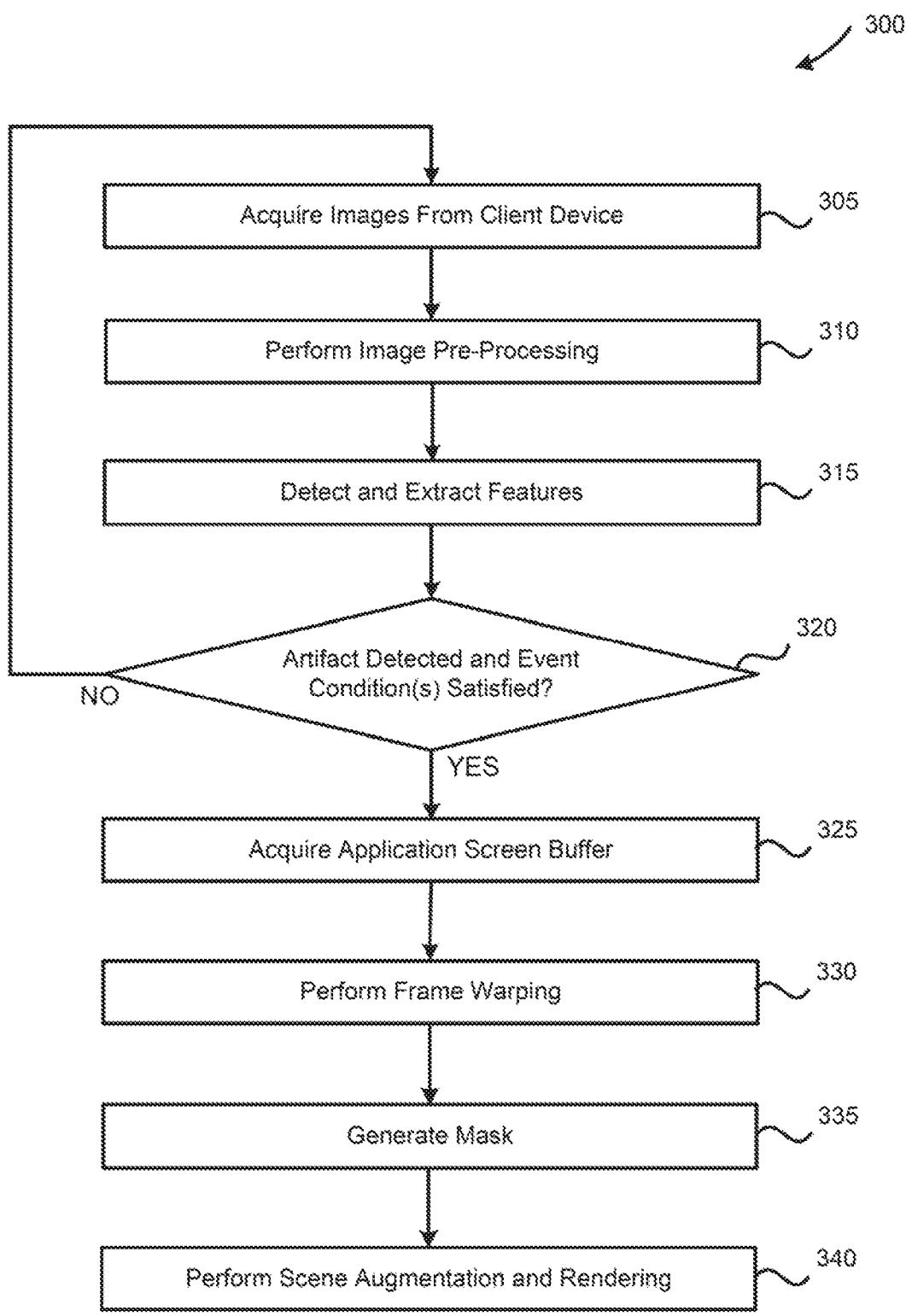
FIG. 3 illustrates example operations for using a virtual reality (VR) and/or augmented reality (AR) engine to augment a scene, according to embodiments of the present disclosure.

FIG. 3 illustrates example operations 300 for using a virtual reality (VR) and augmented reality (AR) engine 132 to augment a scene, according to embodiments of the present disclosure.

At 305, VR/AR engine 132 acquires images from client device 140. For example, VR/AR engine 132 may request images at a particular frame rate and resolution (determined in advance and stored in planning/policy management module 212) to be captured by a sensor such as a camera of client device 140, and VR/AR client 142 may send the images to VR/AR engine 132. The images may comprise scene images of the real-world environment around the user of client device 140, and may contain one or more artifacts to be augmented.

At 310, VR/AR engine 132 performs image pre-processing as needed. For example, pre-processing may involve resizing, smoothing, noise removal, and the like, as needed to prepare images for feature detection.

At 315, VR/AR engine 132 detects and extracts features in the scene images. For example, VR/AR engine 132 may perform a feature detection process (e.g., involving the use of A-KAZE, homography, etc.) in order to identify characteristics, such as artifacts to be augmented, in the scene images. VR/AR engine 132 may draw a bounding box around a detected artifact, obtain the coordinates of the bounding box, and track the position of the artifact with each subsequent scene image.

At 320, VR/AR engine 132 determines if an artifact to be augmented has been detected and whether any relevant conditions have been satisfied. For example, if the user identified a particular object (e.g., a piece of paper) in the scene as an artifact to be augmented, VR/AR engine 132 determines whether that particular artifact is present in the scene image. If the user indicated additional conditions to be met before augmentation is performed (e.g., client device 140 being at a particular geographic location, such as the user's office), VR/AR engine 132 also determines whether these conditions have been met (e.g., determining, based on a GPS device associated with client device 140 whether client device 140 is located in the user's office). For example, if a condition states that client device 140 must be located in the user's office, then the augmentation task will only be performed if the artifact is present in the scene image and the GPS device associated with client device 140 indicates that the user is located in the user's office. If the artifact is present and any relevant conditions have been met, operations continue at 325. Otherwise, operations return to 305, where additional images are acquired from client device 140.

At 325, VR/AR engine 132 acquires an application screen buffer from service 122. For example, service 122 may be a virtualization application which allows for the management and use of virtual machines, and the application screen buffer may comprise the screen of a virtual machine.

At 330, VR/AR engine 132 performs frame warping in order to prepare the application screen buffer to be added to the scene image. For example, VR/AR engine may apply geometric transforms to the application screen buffer as needed to align it with the artifact in the scene image.

At 335, VR/AR engine 132 generates a mask for the application screen buffer to allow it to be placed on the artifact in the scene image. For example, the mask may be generated based on the coordinates of the bounding box of the artifact in the scene image, and may place the application screen buffer at the correct coordinates to overlay the artifact in the scene image.

At 340, VR/AR engine 132 performs scene augmentation (with the warped application screen buffer) and renders the final scene images. For example, the warped application screen buffer may be placed, using the mask, onto the scene images so that the application screen buffer appears to overlay the artifact. The final scene images may be rendered and provided to client device 140 for viewing by the user as an augmented reality experience through VR/AR client 142. As described above, in alternative embodiments the augmentation and rendering may be performed by client device 140 rather than VR/AR engine 132.

Figure 4:
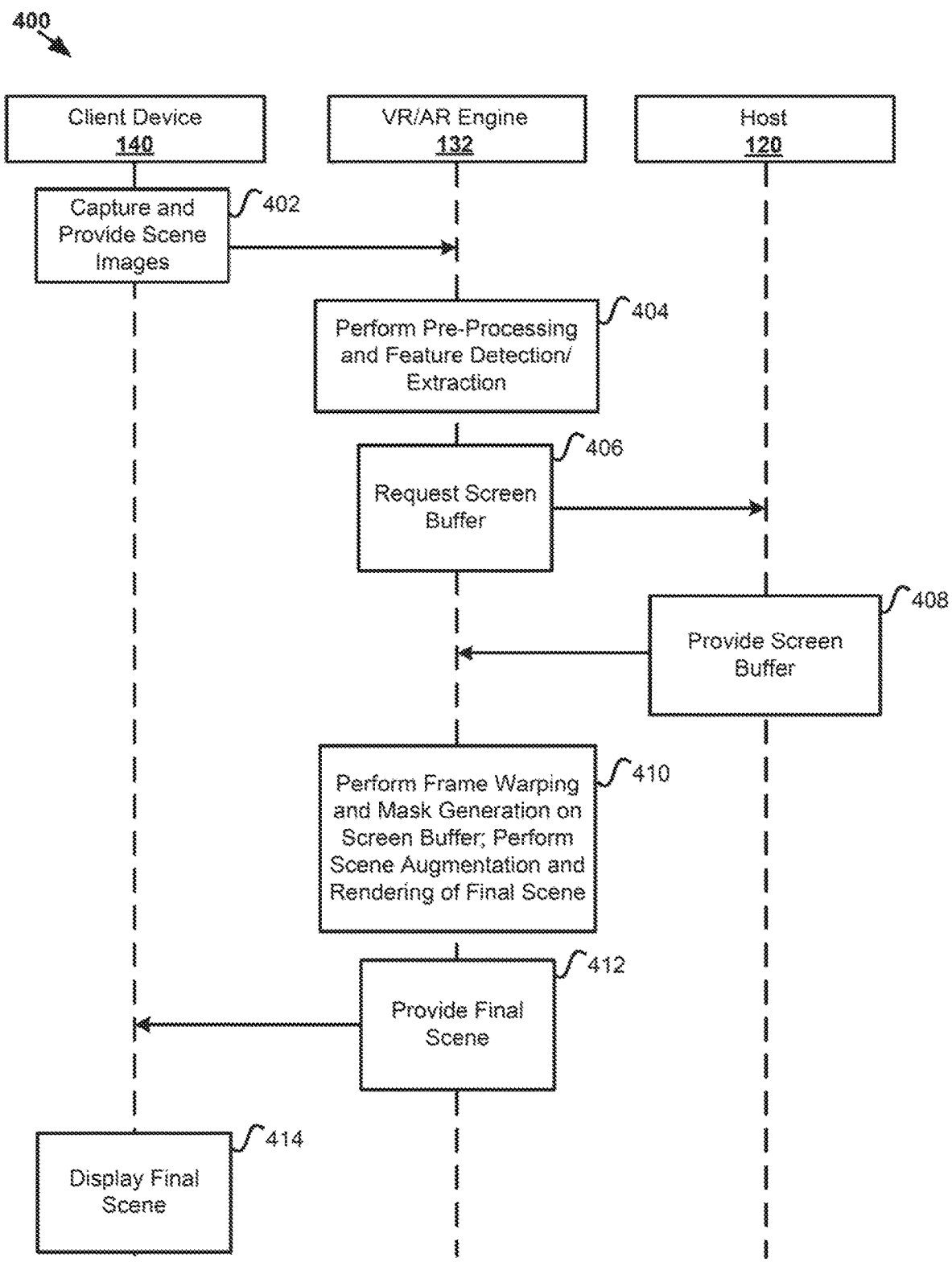
FIG. 4 illustrates a message flow between components involved in using a virtual reality (VR) and/or augmented reality (AR) engine to augment a scene, according to embodiments of the present disclosure.

FIG. 4 illustrates a message flow 400 between components involved in using a virtual reality (VR) and/or augmented reality (AR) engine 132 to augment a scene, according to embodiments of the present disclosure. As shown, messages are exchanged between client device 140, VR/AR engine 132, and host 120.

At 402, client device 140 captures and provides scene images to VR/AR engine 132. In some embodiments, this is done at the request of VR/AR engine 132, which may request scene images at a particular frame rate and resolution. Client device 140 may use a sensor such as a camera to capture the scene images.

At 404, VR/AR engine 132 performs pre-processing and feature detection/extraction on the scene images. These processes are described above, and may involve resizing and removing noise from the images before using homography to detect and extract (e.g., using a bounding box) one or more artifacts to be augmented in the scene image.

At 406, VR/AR engine 132 requests an application screen buffer from host 120, which provides the application screen buffer in response at 408. In some embodiments, host 120 (or another component) may provide one or more advertisements to VR/AR engine 132 as well so that the advertisements may be added to the final scene image in addition to the application screen buffer.

At 410, VR/AR engine 132 performs frame warping, as well as mask generation, for the application screen buffer, and then augments the one or more artifacts in the scene images with the application screen buffer in order to render final scene images. In some embodiments, VR/AR engine 132 also augments the scene images with advertisements. In certain embodiments, as described above, augmentation and/or rendering are performed by client device 140 rather than VR/AR engine 132.

At 412, VR/AR engine 132 provides the final scene images to client device 140, which then displays the final scene images at 414. For example, client device 140 may comprise a wearable augmented reality display through which a user can view an augmented reality experience wherein the one or more artifacts appear to be overlaid with the application screen buffer. The user may then be able to interact with the final scene images, such as through gestures detected using sensors of client device 140, touch screen, voice commands, mouse, or keyboard.

Embodiments of the present disclosure may be useful in a vast number of contexts, as they allow for a VR/AR experience of applications and services which do not natively support VR or AR, and which may be too resource-intensive for VR/AR functionality to be implemented primarily on user devices with limited resources such as wearable AR displays or mobile phones. Embodiments may be useful, for example, in environments where traditional displays and input devices are inconvenient, such as hospitals, security and defense contexts, research labs, and space facilities (e.g., the International Space Station). Additionally, in such environments, physical space may be limited and users may have difficulty providing traditional input, allowing a virtual desktop screen to be rendered into the user's environment so that the user can view and interact with the virtual desktop or applications running on it, in a more dynamic fashion may significantly improve the user's experience of the virtual desktop or the application running on it.

Furthermore, because embodiments of the present disclosure involve the abstraction of VR/AR functionality away from applications and individual client devices, they may allow multiple users to collaborate in a VR/AR experience of an application. For example, multiple client devices may provide scene images to VR/AR engine 132, which may augment artifacts within the scene images at each client device with the same screen buffer from service 122, continuously updating the screen buffer at all client devices based on user input received from all client devices, thus providing a unified collaborative VR/AR experience of service 122. In some embodiments, for example, a user may share the desktop of a virtual machine (e.g., the screen buffer of service 122) with a user of another client device, and both users may view and interact with the virtual machine through a shared augmented reality experience.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The computer readable media may be non-transitory. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for providing an augmented reality experience, comprising:
 acquiring, by a computing device:
  one or more first images from a first client device separate from the computing device; and
  one or more second images from a second client device separate from the computing device, wherein the one or more first images and the one or more second images were transmitted over a network to the computing device for augmentation processing;
 determining, by the computing device, that the one or more first images contain a first artifact;
 determining, by the computing device, that the one or more second images contain a second artifact;
 receiving first input from a first user of the first client device indicating that the first artifact in the one or more first images is to be augmented with a virtual desktop corresponding to a virtual machine located on a host machine separate from the computing device;
 receiving second input from a second user of the second client device indicating that the second artifact in the one or more second images is to be augmented with the virtual desktop corresponding to the virtual machine; and
 performing, by the computing device, the augmentation processing based on the first input and the second input, by at least in part:
  acquiring, by the computing device, a screen buffer of the virtual desktop from the virtual machine;
  applying, by the computing device, a geometric transformation to the screen buffer;
  augmenting, by the computing device, the one or more first images by inserting the screen buffer onto the first artifact, resulting in one or more first augmented images; and
  augmenting, by the computing device, the one or more second images by inserting the screen buffer onto the second artifact, resulting in one or more second augmented images; and
 after confirming, based on configuration information associated with a virtual desktop infrastructure manager on the host machine, that the first user and the second user are allowed to access the virtual desktop:
  providing, by the computing device, the one or more first augmented images to the first client device over the network and the one or more second augmented images to the second client device over the network in order to provide the first user and the second user with a shared augmented reality experience of the virtual desktop;

receiving third input from the first user based on the first user interacting with the shared augmented reality experience, wherein the third input comprises a request to perform one or more actions comprising one or more of: suspending the virtual machine, stopping the virtual machine, taking a snapshot of the virtual machine, taking a screenshot of the virtual desktop, triggering migration of the virtual machine, or creating a template based on the virtual machine; and performing, by the computing device, the one or more actions based on the third input through interaction with the virtual desktop infrastructure manager.

2. The method of claim 1, further comprising:

prior to determining that the one or more first images contain the first artifact to be augmented, pre-processing, by the computing device, the one or more first images.

3. The method of claim 2, wherein the pre-processing of the one or more first images comprises at least one of: resizing; noise removal; and smoothing.

4. The method of claim 1, wherein the geometric transformation involves nearest neighbor interpolation.

5. The method of claim 1, wherein the determining that the one or more first images contain the first artifact is based on homography.

6. The method of claim 5, wherein the acquiring of one or more first images from the first client device comprises:

acquiring, by the computing device, the one or more first images at a specified frame rate and resolution.

7. The method of claim 1, wherein the augmenting of the one or more first images further comprises:

generating, by the computing device, a mask for the screen buffer; and inserting, by the computing device, the screen buffer onto the first artifact using the mask.

8. The method of claim 1, wherein the method is performed with assistance of a virtualized graphical processing unit (GPU).

9. The method of claim 1, wherein user session recording is used to record both a virtual desktop session screen and the shared augmented reality experience, either separately or simultaneously.

10. A non-transitory computer readable medium comprising instructions to be executed in a computer system, wherein the instructions when executed in the computer system, cause the computer system to:

acquire, by a computing device:

one or more first images from a first client device separate from the computing device; and one or more second images from a second client device separate from the computing device, wherein the one or more first images and the one or more second images were transmitted over a network to the computing device for augmentation processing;

determine, by the computing device, that the one or more first images contain a first artifact;

determine, by the computing device, that the one or more second images contain a second artifact;

receive first input from a first user of the first client device indicating that the first artifact in the one or more first images is to be augmented with a virtual desktop corresponding to a virtual machine located on a host machine separate from the computing device;

receive second input from a second user of the second client device indicating that the second artifact in the one or more second images is to be augmented with the virtual desktop corresponding to the virtual machine; and perform, by the computing device, the augmentation processing based on the first input and the second input, by at least in part:

acquiring, by the computing device, a screen buffer of the virtual desktop from the virtual machine;

applying, by the computing device, a geometric transformation to the screen buffer;

augmenting, by the computing device, the one or more first images by inserting the screen buffer onto the first artifact, resulting in one or more first augmented images; and augmenting, by the computing device, the one or more second images by inserting the screen buffer onto the second artifact, resulting in one or more second augmented images; and after confirming, based on configuration information associated with a virtual desktop infrastructure manager on the host machine, that the first user and the second user are allowed to access the virtual desktop:

provide, by the computing device, the one or more first augmented images to the first client device over the network and the one or more second augmented images to the second client device over the network in order to provide the first user and the second user with a shared augmented reality experience of the virtual desktop;

receive third input from the first user based on the first user interacting with the shared augmented reality experience, wherein the third input comprises a request to perform one or more actions comprising one or more of: suspending the virtual machine, stopping the virtual machine, taking a snapshot of the virtual machine, taking a screenshot of the virtual desktop, triggering migration of the virtual machine, or creating a template based on the virtual machine; and perform, by the computing device, the one or more actions based on the third input through interaction with the virtual desktop infrastructure manager.

11. The non-transitory computer readable medium of claim 10, wherein the instructions, when executed in the computer system, further cause the computer system to:

prior to determining that the one or more first images contain the first artifact to be augmented, pre-process, by the computing device, the one or more first images.

12. The non-transitory computer readable medium of claim 11, wherein the pre-processing of the one or more first images comprises at least one of: resizing; noise removal; and smoothing.

13. The non-transitory computer readable medium of claim 10, wherein the geometric transformation involves nearest neighbor interpolation.

14. The non-transitory computer readable medium of claim 10, wherein the determining that the one or more first images contain the first artifact is based on homography.

15. The non-transitory computer readable medium of claim 10, wherein the acquiring of one or more first images from the first client device comprises:

acquiring, by the computing device, the one or more first images at a specified frame rate and resolution.

16. The non-transitory computer readable medium of claim 10, wherein the augmenting of the one or more first images further comprises:
    generating, by the computing device, a mask for the screen buffer; and
    inserting, by the computing device, the screen buffer onto the first artifact using the mask.

17. The non-transitory computer readable medium of claim 10, wherein the instructions involve performing one or more operations with assistance of a virtualized graphical processing unit (GPU).

18. The non-transitory computer readable medium of claim 10, wherein user session recording is used to record both a virtual desktop session screen and the shared augmented reality experience, either separately or simultaneously.

19. A computer system, wherein system software for the computer system is programmed to cause the computer system to:
    acquire, by a computing device:
        one or more first images from a first client device separate from the computing device; and
        one or more second images from a second client device separate from the computing device, wherein the one or more first images and the one or more second images were transmitted over a network to the computing device for augmentation processing;
    determine, by the computing device, that the one or more first images contain a first artifact;
    determine, by the computing device, that the one or more second images contain a second artifact;
    receive first input from a first user of the first client device indicating that the first artifact in the one or more first images is to be augmented with a virtual desktop corresponding to a virtual machine located on a host machine separate from the computing device;
    receive second input from a second user of the second client device indicating that the second artifact in the one or more second images is to be augmented with the virtual desktop corresponding to the virtual machine; and
    perform, by the computing device, the augmentation processing based on the first input and the second input, by at least in part:
        acquiring, by the computing device, a screen buffer of the virtual desktop from the virtual machine;
        applying, by the computing device, a geometric transformation to the screen buffer;
        augmenting, by the computing device, the one or more first images by inserting the screen buffer onto the first artifact, resulting in one or more first augmented images; and
        augmenting, by the computing device, the one or more second images by inserting the screen buffer onto the second artifact, resulting in one or more second augmented images; and
    after confirming, based on configuration information associated with a virtual desktop infrastructure manager on the host machine, that the first user and the second user are allowed to access the virtual desktop:
        provide, by the computing device, the one or more first augmented images to the first client device over the network and the one or more second augmented images to the second client device over the network in order to provide the first user and the second user with a shared augmented reality experience of the virtual desktop;
        receive third input from the first user based on the first user interacting with the shared augmented reality experience, wherein the third input comprises a request to perform one or more actions comprising one or more of: suspending the virtual machine, stopping the virtual machine, taking a snapshot of the virtual machine, taking a screenshot of the virtual desktop, triggering migration of the virtual machine, or creating a template based on the virtual machine; and
        perform, by the computing device, the one or more actions based on the third input through interaction with the virtual desktop infrastructure manager.

20. The computer system of claim 19, wherein the system software for the computer system is programmed to further cause the computer system to:
    prior to determining that the one or more first images contain the first artifact to be augmented, pre-process, by the computing device, the one or more first images.

21. The computer system of claim 20, wherein of the one or more first images comprises at least one of: resizing; noise removal; and smoothing.

22. The computer system of claim 19, wherein the geometric transformation involves nearest neighbor interpolation.

23. The computer system of claim 19, wherein the determining that the one or more first images contain the first artifact to be augmented is based on homography.

24. The computer system of claim 19, wherein the acquiring of one or more first images from the first client device comprises:
    acquiring, by the computing device, the one or more first images at a specified frame rate and resolution.

25. The computer system of claim 19, wherein the augmenting of the one or more first images further comprises:
    generating, by the computing device, a mask for the screen buffer; and
    inserting, by the computing device, the screen buffer onto the first artifact using the mask.

26. The computer system of claim 19, wherein the system software for the computer system is programmed to further cause the computer system to perform one or more operations with assistance of a virtualized graphical processing unit (GPU).

27. The computer system of claim 19, wherein user session recording is used to record both a virtual desktop session screen and the shared augmented reality experience, either separately or simultaneously.

* * * * *